Aug. 30, 1938.　　　J. P. LONG　　　2,128,656

SHOCK ABSORBER ATTACHMENT FOR BUMPERS

Filed Jan. 11, 1935

INVENTOR

Joseph P. Long

Patented Aug. 30, 1938

2,128,656

UNITED STATES PATENT OFFICE 2,128,656

SHOCK ABSORBER ATTACHMENT FOR BUMPERS

Joseph P. Long, New York, N. Y.

Application January 11, 1935, Serial No. 1,328

1 Claim. (Cl. 293—55)

This invention relates to an improved attachment for automobiles, and its leading object is to provide a shock absorber for reducing the shock of end collisions, which can be attached to a bumper at either end of the vehicle.

Another object of the invention is the provision of an attachment of this character with a rubber shock absorbing element adapted to receive the initial impact of collision, and a plurality of compression springs, one yielding in advance of the other at a lower impact load, whereby larger spring resistance will be offered to the force of the collision as it develops.

A further object of the invention is to provide a shock absorbing attachment for bumpers with a main thrust head, clamping means for supporting the main thrust head or shoe on a bumper bar, and a pair of spring boxes connecting the main thrust head or shoe to the clamping means, each of the spring boxes including telescoping housing members and tension springs therein, and means to prevent the complete separation of the housing members from each other.

With the above and other objects in view the invention consists in certain new and useful constructions, combinations and arrangements of parts, clearly described in the following specification, and fully illustrated in the accompanying drawing, in which:—

Referring to the accompanying drawing 5 designates a spring bumper bar, which is connected at its opposing ends 6 and 7 by the brackets 8 and 9 to the frame of the vehicle 10. These parts are old and well known and may be of any suitable construction.

Figure 2:
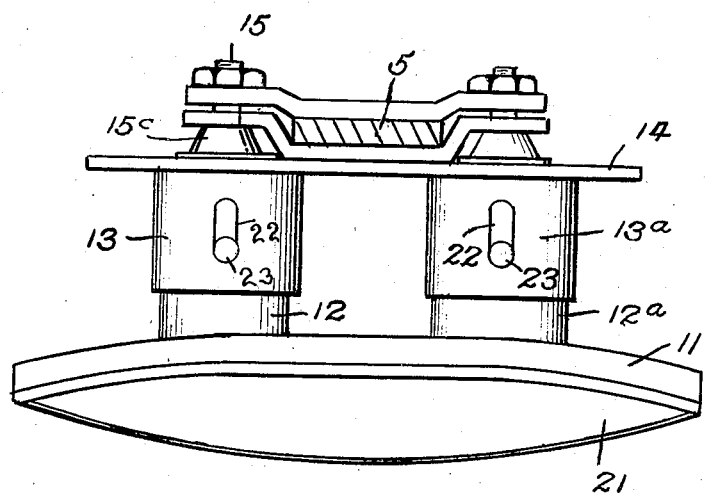
Fig. 2 is a vertical sectional view, taken on line 2—2 of Fig. 1, looking in the direction of the arrows.
Figure 3:
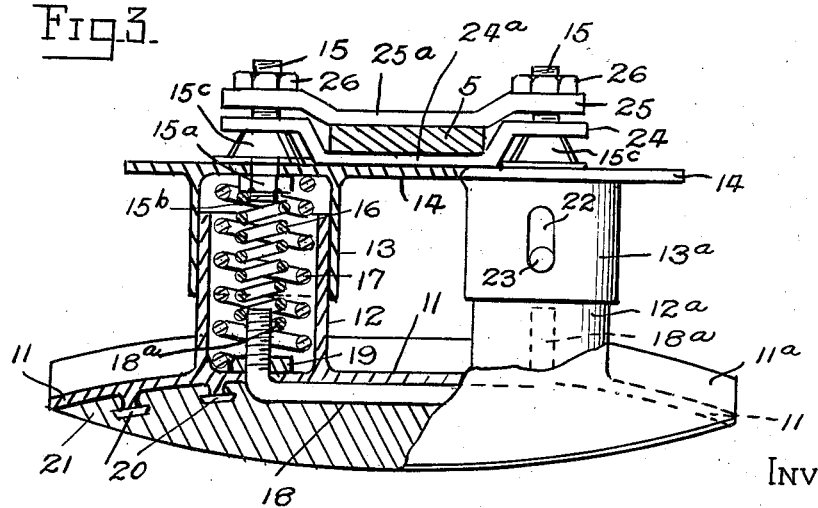
Fig. 3 is another similar view, showing one of the spring boxes and a portion of the main thrust head in section.

My invention consists of a shock absorber which is coupled or clamped to the bumper bar, and this attachment may be used singly on the bumper bar, or used in pairs, as indicated in Fig. 2.

Each shock absorber consists of a main thrust head or member 11, which is made of cast or other metal, and which is provided with integral spring boxes 12 and 12a. These boxes are disposed in parallel relation and spaced apart. These spring boxes 12 and 12a slide within the spring boxes 13 and 13a which are cast integral with the box holding bar 14, or which may be otherwise connected to said box holding bar.

The box holding bar 14 is equipped with a screw threaded bolt or member 15, which projects through the bar into the spring box 13, and may be provided with a nut or head 15a on its enclosed end, and with a stud portion 15b which projects inwardly of the head to form an axial guide or support for the inner coil spring 16, designed to yield when the maximum impact pressure is imposed on the shock absorber, whereas at the beginning of a lighter impact this spring 16 remains still inactive, because this spring 16 ends already some distance from the bottom of the box 12. In the spring box 12 a larger coil spring 17 is arranged around the first coil spring, and this larger spring 17, which extends over the whole inner length of the two telescoping boxes or cylinders 12 and 13, is designed to yield from the beginning of the impact and under a pressure lower than that required to compress the coil spring 16. Two similar coil springs also work in the spring boxes 12a and 13a of the thrust head 11.

This thrust head or member is equipped with a U-shaped bolt 18, which is welded to the central portion of the head or member 11, and which provides a threaded terminal 18a which projects through the member 11 into the spring box 12, and a similar threaded angular terminal which projects into the spring box 12a, but which is not shown for convenience of illustration. A nut 19 is threaded on each angular terminal of the bolt 18 and the end of each bolt terminal forms a positioning centre for the end of its coordinate inner spring 16.

The thrust head is in the form, on its rear side, of a channel, to provide reinforcing flanges 11a, and its forward side is formed or provided with T-shaped integral pins 20, to which the rubber shoe or cushioning block 21 is secured, by interlocking by a moulding or fitting operation. This resilient rubber shoe is curved forwardly midway of its upper and lower ends to provide a convex mass of rubber designed to receive the initial impact of collision.

The outer spring boxes 13 and 13a are formed with a longitudinal slot 22 on each side thereof, through which the stud pin or screw 23 projects. This stud pin or screw is fixed to the wall of the inner box of each spring box set, and forms means for limiting the outward play of the spring boxes, under the tension of the compression springs therein.

The box holding bar 14, which at the same time serves as the bottom of the spring boxes 13, 13a, is secured to the bumper bar by means of the bolts 15, each box being provided with a similar bolt, which projects rearwardly thereof. This projecting portion is equipped with a conical head or shoulder 15c and a threaded clamping bolt 15 projecting outwardly thereof.

An inner clamping bar 24 straddles the bolts 15 of the two spring boxes, and is provided with an inwardly offset central portion 24a, forming one jaw to grip the bumper bar. A companion clamping bar 25 also straddles the two bolts 15, and this may also be formed with a centrally offset portion 25a, forming the other jaw to grip the bumper bar. The two clamping bars 24 and 25 are secured in gripping position by means of the nuts 26, which are threaded on the outer ends of the bolts 15.

Figure 1:
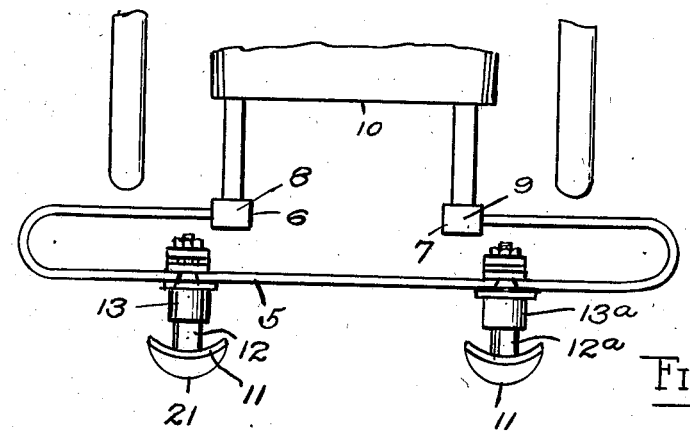
Fig. 1 is a plan view showing a pair of the attachments connected to a standard type of bumper bar.

When two or more of the attachments are employed on a single bumper, they are spaced apart, as indicated in Fig. 1, so that the attachments will operate independently of each other or together, according to the direction, location and force of the impact of collision.

The tension of the springs may be arranged to handle or operate under different collision loads. The springs are so arranged that the outer springs will yield first, after the pressure of the collision has forced back the rubber covered thrust head, and then the inner springs, which yield under higher tension or load, will yield.

The initial force of the impact is taken up by the yielding rubber cover or shoe of the thrust member or head. The rubber will be subjected to a compressive action, and then the thrust head will yield toward the clamping bars. If the pressure of collision is greater on one of the attachments than on the other, the attachment receiving the greatest pressure will yield to a greater extent than the other attachment.

After the rubber shoe of any attachment is displaced and the thrust head yields, the outer coil springs will yield, thus absorbing the second phase of the pressure produced by the collision. If the resistance offered by the bumper itself and the rubber shoe and the outer coil springs is insufficient to absorb all of the force of the collision, then the inner coil springs will be compressed.

It is the standard practice to provide automobiles with weak bumpers, offering insufficient resistance to collision action. These bumpers do not adequately protect the vehicles against collisions, and are easily ruined by moderate impacts. By the use of my attachment the resistance of any bumper may be safely increased, so that adequate protection against collision is obtained.

It has been found in actual trial tests that the attachable shock absorber greatly increases the effective protection offered by any standard bumper, and also provides a broader vertical impact area for the bumper, which also performs the additional service of preventing the bumper of one vehicle from being locked to the bumper of another vehicle.

Various changes in the details of construction, combination and arrangements of parts may be resorted to, without departing from the spirit of the invention, as defined in the claim accompanying this specification.

Having described my invention, I claim:—

A shock absorbing attachment for the bumper rail of an automotive vehicle, consisting of two pairs of oppositely directed telescoping cylinders, provided with inner expansion springs and with expansion-limiting means; a common bottom plate for the two cylinders nearer to the bumper rail, said bottom plate crossing vertically in front of the bumper rail; two clamp-forming bars crossing in front of and behind the bumper rail respectively and adapted to be pressed together so as to be secured to the bumper rail; two screw-threaded fastening bolts passing above and below the bumper rail respectively through the said bottom plate and through the two clamping bars; a common bottom plate for the two cylinders remote from the bumper rail; and an impact receiving thrust-head on the last said bottom plate.

JOSEPH P. LONG.